United States Patent
Foreman et al.

(10) Patent No.: US 10,169,502 B2
(45) Date of Patent: Jan. 1, 2019

(54) ADDRESSING OF PROCESS AND VOLTAGE POINTS

(71) Applicant: International Business Machines Corporation, Armonk, NY (US)

(72) Inventors: Eric A. Foreman, Fairfax, VT (US); Jeffrey G. Hemmett, St. George, VT (US); Stephen G. Shuma, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/244,541

(22) Filed: Aug. 23, 2016

(65) Prior Publication Data

US 2018/0060471 A1    Mar. 1, 2018

(51) Int. Cl.
*G06F 17/50* (2006.01)

(52) U.S. Cl.
CPC ...... *G06F 17/5031* (2013.01); *G06F 17/5036* (2013.01); *G06F 17/5068* (2013.01); *G06F 17/5081* (2013.01); *G06F 2217/08* (2013.01); *G06F 2217/12* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 7,310,792 B2* | 12/2007 | Verghese | ............ | G06F 17/5031 716/113 |
| 7,650,580 B2 | 1/2010 | Kucukcakar et al. | | |
| 8,074,189 B2* | 12/2011 | McConaghy | ....... | G06F 17/5036 700/103 |
| 8,180,621 B2* | 5/2012 | Phillips | ............... | G06F 17/5031 703/14 |
| 8,539,411 B2 | 9/2013 | Cui et al. | | |

(Continued)

OTHER PUBLICATIONS

Chang et al., "Parameterized Block-Based Statistical Timing Analysis with Non-Gaussian Parameters, Nonlinear Delay Functions", DAC 2005, Jun. 13-17, 2005, Anaheim, California, USA, Copyright 2005, ACM 1-59593-058-2/05/0006, 6 pages.

(Continued)

*Primary Examiner* — Leigh M Garbowski
(74) *Attorney, Agent, or Firm* — Christopher K. McLane

(57) ABSTRACT

In an approach for addressing process and voltage points across voltage and process space, a computer identifies an integrated circuit design. The computer identifies a timing model associated with the identified integrated circuit design. The computer identifies a minimum set of voltage/process pairs associated with the integrated circuit design. The computer identifies a number n that defines the number of finite differencing operations to be performed for the identified minimum set of voltage/process pairs. The computer performs a single statistical static timing analysis with multi-corner projection for the identified integrated circuit based on the received number n that provides a finite difference for each number of finite differencing operations to be performed based on n for the identified minimum set of voltage/process pairs. The computer performs addressing based on the performed statistical static timing analysis. The computer provides a report.

20 Claims, 4 Drawing Sheets

(56) References Cited

U.S. PATENT DOCUMENTS

| | | |
|---|---|---|
| 8,615,727 B2 | 12/2013 | Ghanta et al. |
| 8,701,063 B1 | 4/2014 | Shrivastava et al. |
| 8,707,233 B2 | 4/2014 | Foreman et al. |
| 8,719,763 B1 | 5/2014 | Bickford et al. |
| 8,769,462 B2 | 7/2014 | Horlacher et al. |
| 8,832,625 B2 | 9/2014 | Foreman et al. |
| 8,893,063 B2 | 11/2014 | Malek-Khosravi et al. |
| 9,141,742 B2 | 9/2015 | Tsai et al. |
| 9,262,569 B2 * | 2/2016 | Bickford ............. G06F 17/5068 |
| 9,798,843 B2 * | 10/2017 | Hu ...................... G06F 17/5031 |

OTHER PUBLICATIONS

Han et al., "A Global-Local Optimization Framework for Simultaneous Multi-Mode Multi-Corner Clock Skew Variation Reduction", DAC'15, Jun. 7-11, 2015, San Francisco, CA, USA, Copyright 2015, ACM 978-1-4503-3520—Jan. 15, 2006, 6 pages.

"Improving IC Silicon Yields by Voltage Drop Based Timing Closure", An IP.com Prior Art Database Technical Disclosure, Authors et. al.: Disclosed Anonymously, IP.com No. IPCOM000187532D, IP.com Electronic Publication Date: Sep. 10, 2009, 7 pages.

\* cited by examiner

ADDRESSING OF PROCESS AND VOLTAGE POINTS

BACKGROUND

The present invention relates generally to the field of statistical static timing analysis, and more particularly to addressing process voltage points.

An integrated circuit (also known as a microcircuit, a microchip, a silicon chip, or a chip) is a miniaturized electronic circuit consisting of mainly semiconductor devices and passive components, manufactured in a surface of a thin substrate of semiconductor material. The integrated circuit is constructed from small electronic circuits called logic gates (i.e., an idealized or physical device implementing a Boolean function that performs a logical operation on one or more logical inputs) that produces a single logical output resulting in an electrical flow or voltage, which can control more logic gates. Operation of the integrated circuit is characterized by a clock frequency (e.g., clock signal). The clock signal oscillates between a high and a low state to coordinate actions of integrated circuits. The logic gates can control the clock signal to effectively enable or disable a portion of the integrated circuit. To gauge the ability of the integrated circuit to operate at a specified speed, measurements of the delays are taken throughout the design process.

Delay calculation, calculates the gate delay (i.e., a length of time between when the input to a logic gate becomes stable and valid to change to the time that the output of that logic gate is stable and valid to change) of a single logic gate and the delay created by the attached wires. Calculation of the gate delay may be provided by circuit simulators, two dimensional tables (e.g., logic synthesis), placement and routing (i.e., tables take an output load and input slope, and generate a circuit delay and output slope), and K factor models (i.e., approximates the delay as a constant plus k times the load capacitance). Calculation of the wire delay may be provided by a lumped C (i.e., entire wire capacitance is applied to the gate output, and the delay through the wire itself is ignored), an Elmore delay (i.e., delay of each wire segment is an electrical resistance (R) of that segment times the electrical capacitance (downstream C)), moment matching (i.e., matches multiple moments in the time domain, or finds a good rational approximation in the frequency domain), and circuit simulators.

Static timing analysis (STA) is an input-independent method of analyzing a frequency or a clock rate (e.g., validating the timing performance) for an integrated circuit by simulating the delays of entire paths of an integrated circuit without requiring a simulation of the full integrated circuit. STA breaks down the design of the integrated circuit into a set of timing paths, calculates the signal propagation delay along each path (i.e., time required for a digital signal to travel from the input of a logic gate to the output), and checks for violations of timing constraints. Two kinds of violations (e.g., timing errors) are possible: a setup time violation and a hold time violation. A setup time violation is based on a setup constraint that specifies an amount of time that is necessary for data to be available (e.g., stable) at the input of a sequential device before the clock edge that the input signal needs to guarantee the input signal is properly accepted on the clock edge that captures the data in the device. The hold time violation is based on a hold constraint that specifies how much time is necessary for data to be stable at the input of a sequential device after receiving the clock edge (i.e., the hold constraint enforces a minimum delay on the data path relative to the clock path).

Statistical static timing analysis (SSTA) is an alternative to STA. SSTA replaces fixed or normal deterministic timing of gates and interconnects with probability distributions (e.g., a range of probabilities), thereby returning a distribution of possible circuit outcomes rather than a single outcome. SSTA employs a sensitivity based approach to model the effect of variations on timing by determining how a change in a particular device or interconnect parameter (e.g., oxide, wire thickness, etc.) affects a desired property (e.g., slew, capacitance, etc.). The sensitivity to the parameter in conjunction with the probability distribution (i.e., mean and standard deviation) provides a statistical model describing the probability that a parameter will have a certain effect on a device or interconnect property. SSTA uses sensitivities to identify correlations among delays, and utilizes the correlations when computing how to add statistical distributions of delays (i.e., model the effect on timing). The SSTA maps the standard deviations with respect to the devices and interconnect parameters to obtain an overall standard deviation of the path delay. Algorithms for SSTA include a path-based method, in which a path based algorithm sums gate and wire delays on specific paths and block-based methods, in which a block-based algorithm generates the arrival times and required times for each node, working both forward and backward from the clocked elements.

SUMMARY

Aspects of the present invention disclose a method, computer program product, and system for addressing process and voltage points across voltage and process space, the method comprising computer processors identifying an integrated circuit design. The method further comprises the computer processors identifying a timing model associated with the identified integrated circuit design. The method further comprises the computer processors identifying a minimum set of voltage/process pairs associated with the integrated circuit design. The method further comprises the computer processors identifying a number n that defines the number of finite differencing operations to be performed for the identified minimum set of voltage/process pairs. The method further comprises the computer processors performing a single statistical static timing analysis with multi-corner projection for the identified integrated circuit based on the received number n that provides a finite difference for each number of finite differencing operations to be performed based on n for the identified minimum set of voltage/process pairs. The method further comprises the computer processors performing addressing based on the performed statistical static timing analysis. The method further comprises the computer processors providing a report.

DETAILED DESCRIPTION

Very-large-scale integration (VLSI) is a process of creating an integrated circuit (IC) by combining thousands of transistors into a single chip (i.e., a single small plate of semiconductor material). Embodiments of the present invention recognize that during hardware disposition (e.g., design, placement, arrangement, etc.), in order to achieve constant frequency across all chips in an accepted process range, voltage is often used to offset process variations. Embodiments of the present invention recognize that during design closure modifications of the VLSI design from an initial design to an updated design occur in order to meet changing design constraints and objectives. Embodiments of the present invention recognize that the design closure is performed at a fixed nominal process/voltage point (i.e., Pnom/Vnom) to the target frequency. Embodiments of the present invention also recognize that an optimal design for the fixed frequency across a range of voltage/process points can be determined from knowledge gained through multiple timing runs, which include assertion sets and unique process corners (i.e., a variation of fabrication parameters used in applying an integrated circuit design to a semiconductor wafer, and trial-and-error iterations, however, the voltage/process tradeoffs are non-linear.

Embodiments of the present invention, determine address voltage process points by enabling a design environment that maintains a fixed frequency across all chips. Embodiments of the present invention, maintain the fixed frequency by providing known and potentially optimal voltage/process pairings, which the hardware uses to trade voltage for process. Embodiments of the present invention perform a statistical static timing analysis (SSTA) with multi-corner projection, thereby performing a number (n) of finite difference operations between voltage/process pairings within a single SSTA timing run that grow linearly with the number of requested voltage/process pairs.

Figure 1:
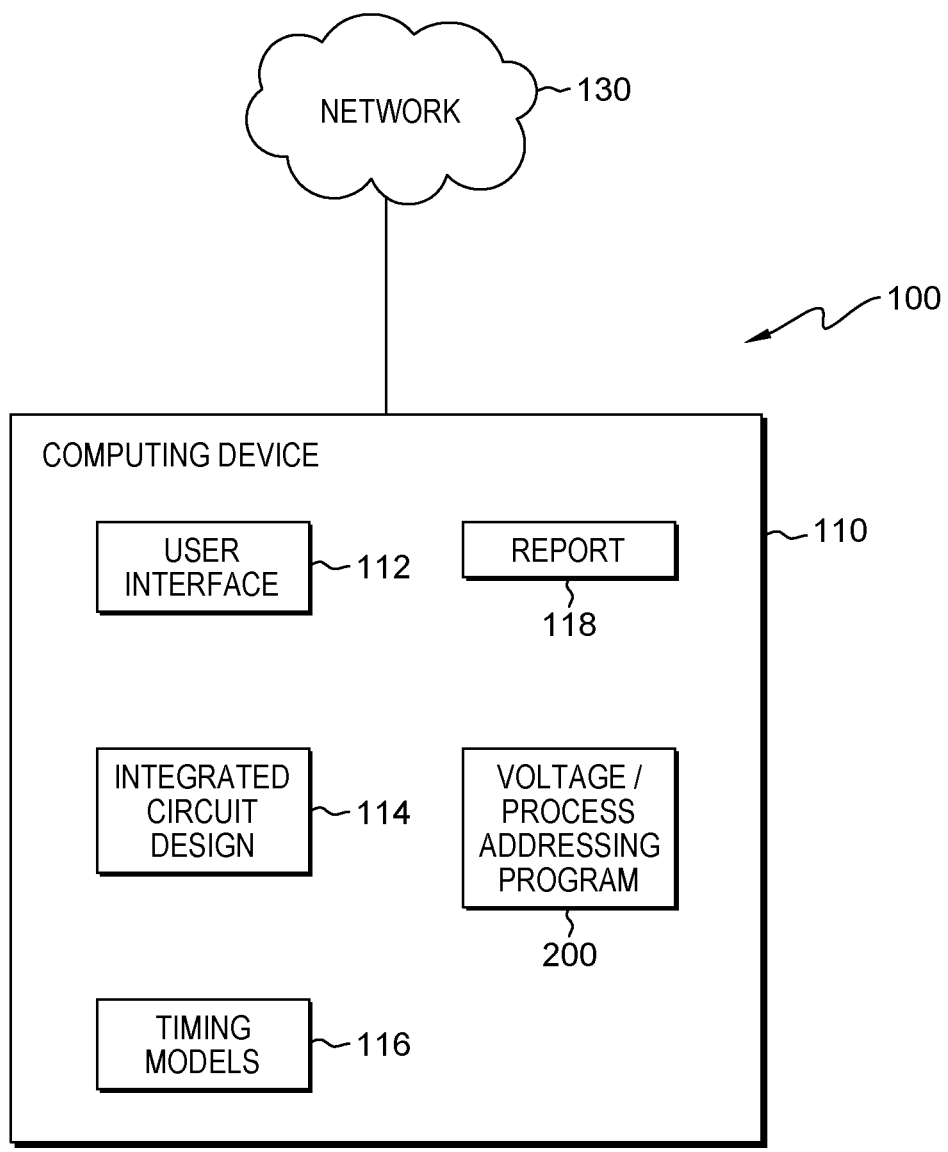
FIG. 1 is a functional block diagram illustrating a statistical static timing analysis environment, in accordance with an embodiment of the present invention.

The present invention will now be described in detail with reference to the Figures. FIG. 1 is a functional block diagram illustrating a statistical static timing analysis environment, generally designated 100, in accordance with one embodiment of the present invention. FIG. 1 provides only an illustration of one embodiment and does not imply any limitations with regard to the environments in which different embodiments may be implemented.

In the depicted embodiment, statistical static timing analysis environment 100 includes computing device 110 and network 130. Statistical static timing analysis environment 100 may include additional computing devices, mobile computing devices, servers, computers, storage devices, networks, or other devices not shown.

Computing device 110 may be a web server or any other electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating over network 130. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. Computing device 110 contains user interface 112, integrated circuit design 114, timing models 116, report 118, and voltage/process addressing program 200.

User interface 112 is a program that provides an interface between a user of computing device 110 and a plurality of applications that reside on computing device 110 (e.g., voltage/process addressing program 200). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to voltage/process addressing program 200.

Integrated circuit design 114 is the schematic or physical design for the construction of an integrated circuit that identifies electronic components (e.g., transistors, resistors, capacitors, wires, logic gates, etc.), a metallic interconnect material, electrical connections, and placement of the electronic components on a piece of semiconductor to create a chip. Creation of integrated circuit design 114 follows an integrated circuit design process that includes: a micro-architecture and system level design (i.e., defines functionality of the integrated circuit and specifications), a register-transfer level (RTL) design (i.e., behavioral model of actual operational functionality), and the physical design (i.e., maps the RTL design into an actual geometric representations of all electronics devices). The physical design includes: logic synthesis, floor planning, placement, logic/placement refinement, clock insertion, routing, post wiring optimization, design for manufacturability, final error checking, and tapeout. Design closure occurs during post wiring optimization, in which violations to performance (i.e., timing closure), noise (i.e., signal integrity), and yield (i.e., design for manufacturability) are removed. In an exemplary embodiment, voltage/process addressing program 200 initiates within post wiring optimization. In another embodiment, voltage/process addressing program 200 initiates at any point during the creation of integrated circuit design 114, in which at least an initial instance of integrated circuit design 114 is available. In the depicted embodiment, integrated circuit design 114 resides on computing device 110. In another embodiment, integrated circuit design 114 may reside on a server or another computing device (not shown) connected to network 130 provided integrated circuit design 114 is available to voltage/process addressing program 200.

Timing models 116 is a library file that identifies delay models (i.e., timing response model) for the electrical components (e.g., inverter, AND gate, OR gate, etc.) of integrated circuit design 114. The delay (e.g., timing response) is the time that passed while a data signal propagates from a starting point to an ending point through a timing path within integrated circuit design 114. Timing models 116 includes a table with the delays that provides a slew rate/load and process/voltage/temperature condition for inputs and outputs of the electrical component in a particular semiconductor technology. The slew rate is a rate of change of voltage per unit of time measured in volts/second and may specify minimum or maximum limits on for inputs and/or outputs, with the limits only valid for a set of provided conditions (e.g., output loading). For an output, the slew rate guarantees that the speed of the output signal transition will be at least a given minimum, or at most the given maximum. For an input, the slew rate indicates that the external driving circuitry needs to meet specified limits in order to guarantee correct operation of a receiving device. Process conditions identify deviations in the semiconductor fabrication process, measured as a percentage variation in a performance calculation, such as variations to impurity concentration densities, oxide thicknesses, and diffusion depths.

Voltage conditions can vary from established ideal value during day-to-day operation, thus changing the delay. For example, a higher voltage reduces the delay (e.g., increases speed), whereas a lower voltage increases the delay (e.g., decreases speed) of integrated circuit design 114. Temperature conditions vary during operation of the chip due to power dissipation (i.e., rate of energy transfer), in which power is converted to heat, thereby increasing a surrounding temperature, which causes an increase in the delay. Each process/voltage/temperature condition within timing models 116 defines a process corner, which specifies the delay of the gates at that process/voltage/temperature condition. The process corner represents a sigma variation (i.e., standard deviation) from nominal doping concentrations to electrical components on the chip (e.g., silicon wafer, slice, semiconductor material, etc.), which changes a duty cycle and slew rate. In the depicted embodiment, timing models 116 resides on computing device 110. In another embodiment, timing models 116 may reside on a server or another computing device (not shown) connected to network 130 provided timing models 116 is available to voltage/process addressing program 200.

Figure 3:
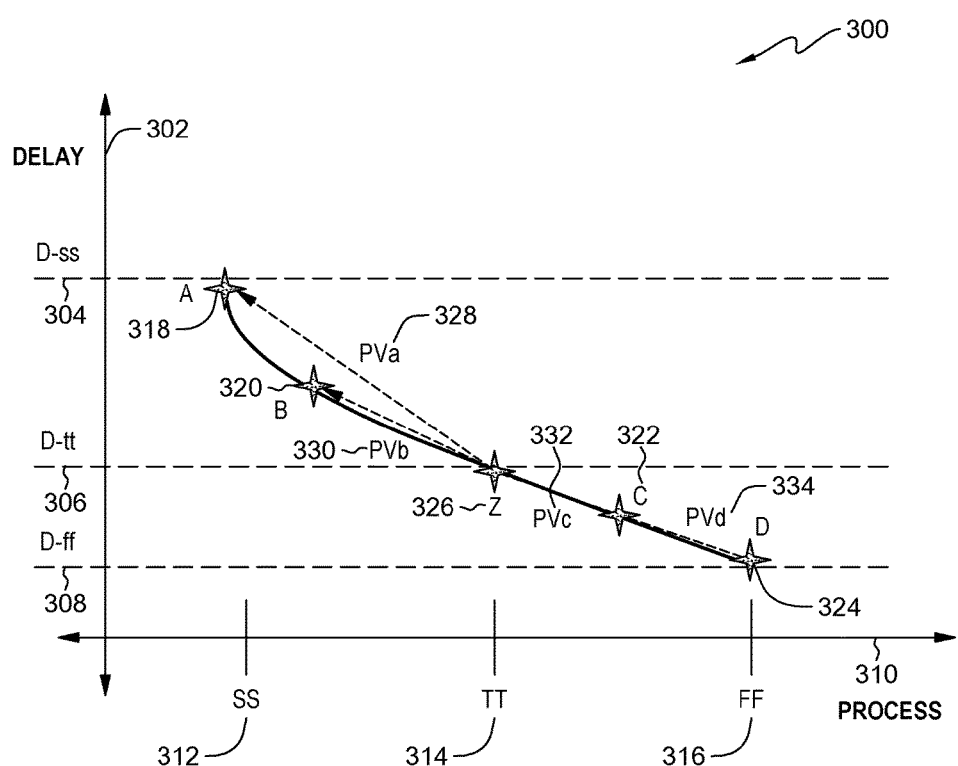
FIG. 3 is an example of addressing process and voltage points within a multi corner-pair process space, in accordance with an embodiment of the present invention.

Report 118 is the output results of voltage/process addressing program 200. In one embodiment, report 118 is a test report detailing the analysis of integrated circuit design 114 with respect to timing models 116 by voltage/process addressing program 200. Report 118 may include graphs that depicts a voltage/process space (e.g., typical operation of integrated circuit design 114) and multi corner-pair process space 300 (e.g., represent changes incurred in the voltage/process space due to two parameters for integrated circuit design 114) as depicted in FIG. 3. In addition report 118 may include information pertaining to the critical path, arrival time, required time, slack, and verify of proper circuit performance. The critical path defines the path between an input and output with the maximum delay. The arrival time is the time elapsed for a signal to arrive at a certain point. The required time is the latest time at which a signal can arrive without making the clock cycle longer than desired. The slack is the difference between the required time and the arrival time. Positive slack implies that the arrival time at a node may be increased without affecting the overall delay of the circuit. Conversely, negative slack implies that a path is too slow, and the path must sped up or incorporate a delay of the reference signal in order for the whole circuit to work at the desired speed. In the depicted embodiment, report 118 reside on computing device 110. In another embodiment, report 118 may reside on a server or another computing device (not shown) connected to network 130 provided voltage/process addressing program 200 is able to access the server or the another computing device (not shown) over network 130.

Voltage/process addressing program 200 is a program for determining address voltage/process points by enabling a design environment that maintains a fixed frequency across all chips for integrated circuit design 114. Voltage/process addressing program 200 maintains the fixed frequency by providing known and potentially optimal voltage/process pairings through timing models 116, which the hardware uses to trade voltage for process when applied to integrated circuit design 114. Voltage/process addressing program 200 utilizes statistical static timing analysis (SSTA) with multi-corner projection as identified within timing models 116, and performs a number (n) of finite difference operations between voltage/process pairings for integrated circuit design 114 within a single SSTA timing run. In the depicted embodiment, voltage/process addressing program 200 resides on computing device 110. In another embodiment, voltage/process addressing program 200 may reside on a server (not shown) or another computing device (not shown) connected to network 130 provided voltage/process addressing program 200 is able to access integrated circuit design 114 and timing models 116.

Figure 2:
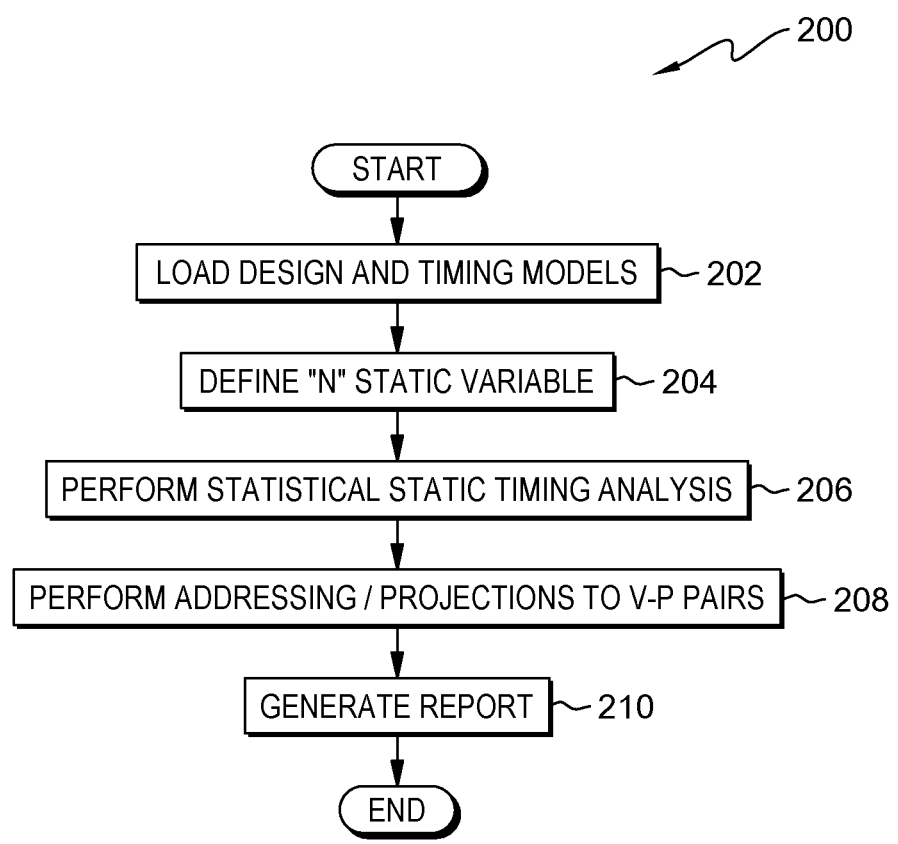
FIG. 2 is a flowchart depicting operational steps of a voltage/process addressing program, on a computing device within the statistical static timing analysis environment of FIG. 1, for addressing process and voltage points across voltage and process points in a single statistical static timing analysis (SSTA) timing run, in accordance with an embodiment of the present invention.

FIG. 2 is a flowchart depicting operational steps of voltage/process addressing program 200, a program for addressing process and voltage points across voltage and process points in a single statistical static timing analysis (SSTA) timing run, in accordance with an embodiment of the present invention. In one embodiment, voltage/process addressing program 200 is a standalone program. In another embodiment, voltage/process addressing program 200 is incorporated within another program as a selectable option and/or automatic test feature within a circuit modeling simulation program. In one embodiment, prior to initiating, at least a preliminary instance of integrated circuit design 114 is available that includes an overall configuration with a current layout of the circuit, planned materials, power constraints, input/output values, etc. to meet functional requirements. For example, integrated circuit design 114 is a preliminary design, an intermediate design, or a final design prior to design closure (i.e., process in which integrated circuit design 114 is modified to meet timing requirements, design constraints, and design objectives). In another embodiment, prior to initiating, a modified and/or finalized instance of integrated circuit design 114 is available for selection in order to verify objectives after incorporating modifications to an initial instance of integrated circuit design 114. In one embodiment, voltage/process addressing program 200 initiates automatically as a part of testing performed on integrated circuit design 114. For example, voltage/process addressing program 200 takes place during post-wiring optimization to remove violations within performance (i.e., timing closure), noise (i.e., signal integrity), and yield (i.e., design for manufacturability). In another embodiment, voltage/process addressing program 200 initiates upon selection by a user through user interface 112 to analyze integrated circuit design 114. Voltage/process addressing program 200 initiates upon receipt (e.g., identification) of integrated circuit design 114 and timing models 116 for test (step 202).

In step 202, voltage/process addressing program 200 loads integrated circuit design 114 and timing models 116. In one embodiment, voltage/process addressing program 200 receives a selection of integrated circuit design 114 and timing models 116 from a script (i.e., macro or batch file of a list of commands that can be executed without interaction from a user) that identifies integrated circuit design 114 and timing models 116 for test. For example, voltage/process addressing program 200 runs (e.g., performs, executes) the script file, which identifies a file name and storage location within memory for integrated circuit design 114 and timing models 116 to voltage/process addressing program 200. Voltage/process addressing program 200 retrieves and loads the identified integrated circuit design 114 and timing models 116 based on the information within the script file. In another embodiment, voltage/process addressing program 200 receives a selection of integrated circuit design 114 and timing models 116 from a user via user interface 112. For example, the user via user interface 112 identifies integrated circuit design 114 and timing models 116 via a pull down menu selections, an open file command, a load file command, in response to prompts to select files for test, etc. Voltage/process addressing program 200 loads integrated circuit design 114 and timing models 116 as identified by the user selections received via user interface 112.

Additionally voltage/process addressing program 200 loads supply voltage (V) and process variation (P) pairs. The supply voltage refers to the voltage obtained from a power source for operation of a circuit or device as described by integrated circuit design 114. Process variation refers to a naturally occurring variation in the attributes of transistors (e.g., lengths, widths, oxide thicknesses) during fabrication of an integrated circuit from integrated circuit design 114. In one embodiment, voltage/process addressing program 200 loads known supply voltage (V) and process variation (P) pairs and/or potentially optimal V-P pairings. In another embodiment, voltage/process addressing program 200 loads a minimal (e.g., minimum) set of V-P pairings that include: a nominal supply voltage (Vnom)/nominal process variation (Pnom), maximum supply voltage (Vmax)/slow process variation (Pslow), and minimum supply voltage (Vmin)/fast process variation (Pfast). The nominal supply voltage (Vnom) is the voltage at which integrated circuit design 114 is designed to operate. The nominal process variation are the critical dimensions (e.g., oxide thickness, resistivity, etc.) that define the fabrication of integrated circuit design 114. As the loaded V-P pairings are variable, voltage/process addressing program 200 utilizes a constant operating temperature and frequency when performing the SSTA (step 206).

In step 204, voltage/process addressing program 200 defines a number "n" static variables. The number "n" defines the number of finite difference operations that voltage/process addressing program 200 performs between V-P pairings (e.g., Vn/Pn) in which each Vn/Pn is a static variable. In one embodiment, voltage/process addressing program 200 defines the number "n" based on a predefined number (e.g., included in the script file, minimum number, default, etc.). In another embodiment, voltage/process addressing program 200 determines the number "n" based on the number of voltage/process pairings. In another embodiment, voltage/process addressing program 200 receives a number "n" in response to a prompt provided to the user for input via user interface 112.

In step 206, voltage/process addressing program 200 performs a statistical static timing analysis (SSTA). Voltage/process addressing program 200 runs a single SSTA timing run with multi-corner projection. A process corner is a design of experiments (DoE) technique that refers to a variation of fabrication parameters used in applying an integrated circuit design (e.g., integrated circuit design 114) to a semiconductor wafer. The process corners represent extremes of fabrication parameter variations within which a circuit etched onto a wafer must function correctly, although the circuit may run slower or faster than specified, and at lower or higher temperatures and voltages. The process corners include: typical-typical (TT), fast-fast (FF), and slow-slow (SS). TT, FF, and SS, are even process corners in which both types of devices are affected evenly, and do not adversely affect the logical correctness of the circuit. FF is a fast corner that exhibits carrier mobility (i.e., how quickly an electron can move through a metal or semiconductor, when pulled by an electric field) that is faster than normal. SS is a slow corner that exhibits carrier mobility that is slower than normal. TT is a typical corner that exhibits carrier mobility that is normal.

Voltage/process addressing program 200 separates integrated circuit design 114 into timing paths for the SSTA in which each timing path has a start point (i.e., input port of integrated circuit design 114) and an end point (e.g., output port of integrated circuit design 114) that varies with the type of timing path. For example, for a data path, the start point identifies a place in integrated circuit design 114 that launches the data by a clock edge and the end point identifies the location the data is captured by another clock edge. The timing path encompasses the combinational logic the data propagates through from the starting point to the end point. Voltage/process addressing program 200 calculates the signal propagation delay along each path for the identified V-P pairings by replacing fixed or normal deterministic timing of gates and interconnects with probability distributions (e.g., a range of probabilities), thereby returning a distribution of possible outcomes rather than a single outcome. Voltage/process addressing program 200 utilizes the sensitivity based approach of SSTA to model the effect of variations on timing by determining affects to a desired property (e.g., slew, capacitance, etc.) for the paths of integrated circuit design 114.

Voltage/process addressing program 200 performs "n" number of finite difference operations between the V-P pairings for integrated circuit design 114 with respect to the timing models 116 (i.e., delay, timing response for a slew/load PVT condition) and the process corners (e.g., TT, FF, and SS) along the paths. Voltage/process addressing program 200 processes each identified individual V-P pair (step 202) as a single parameter with respect to Vnom/Pnom, as each individual V-P pair is correlated (i.e., the voltage and process of each individual V-P pair share a connection and are related in a definable manner). The V-P pair includes two independent terms that represent the same parameter, but the same parameter is over two different regions. The region is a voltage/process point within the parameter space. For example, SS process/high voltage is a first region, and TT process/nominal voltage is a second region. A single finite difference is between the two regions, and a sensitivity is stored in a first parameter. By utilizing the V-P pair as a single parameter, voltage/process addressing program 200 performs a single sensitivity calculation for each corner-pair (e.g., combination of Z 326 and A 318 are a corner-pair) rather than multiple sensitivity calculations to locate a canonical (i.e., a unique representation for every object such as unique coordinate).

Voltage/process addressing program 200 utilizes the sensitivity of the single parameter in conjunction with the probability distribution (i.e., mean and standard deviation) to provide a statistical model that describes the probability that the parameter affects a device or interconnect property within the multi corner pair process space in a certain manner. Through the SSTA, voltage/process addressing program 200 identifies correlations among the delays based on the sensitivities that provide the basis for computing how to add statistical distributions of delays (i.e., model the effect on timing). Voltage/process addressing program 200 maps the standard deviations (e.g., finite difference) with respect to the devices and interconnect parameters of integrated circuit design 114 to obtain an overall standard deviation of the path delays. Voltage/process addressing program 200 calculates the finite difference for a V-P pair as: (Starting Process Corner–Process Point of a V-P Pair)/(sigma of the starting process corner–sigma of the V-P Pair).

For example and as depicted in FIG. 3, the process/voltage library provides A 318, B 320, C 322, and D 324 as process/voltage points, and Z 326 as a starting process/voltage corner/point that is fixed at zero sigma (i.e., Vnom/Pnom). Voltage/process addressing program 200 calculates the finite difference (e.g., sigma value, standard deviation, σ) for A 318, B 320, C 322, and D 324, thereby quantifying the amount of variation or dispersion between each individual V-P pair and the starting process corner, Z 326 (i.e., Vnom/Pnom). Voltage/process addressing program 200 calculates the finite difference for A 318 as: (Z 326–A318)/(0–(−3)). Voltage/process addressing program 200 calculates the finite difference for B 320 as: (Z 326–B 320)/(0–(−1.5)). Voltage/process addressing program 200 calculates the finite difference for C 322 as: (Z 326–C 322)/(0–1.5). Voltage/process addressing program 200 calculates the finite difference for D 324 as: (Z 326–D 324)/(0–3). As voltage/process addressing program 200 calculates the requested "n" finite differences for each individual V-P pair, the number of static parameters grow linearly.

Voltage/process addressing program 200 identifies a delay with respect to integrated circuit design 114 for the V-P pair based on timing models 116. Voltage/process addressing program 200 retrieves the delay via a look-up delay table within timing models 116 that identifies gate types with a slew/load process, voltage, temperature (PVT) condition. For example, as voltage/process addressing program 200 analyzes integrated circuit design 114, voltage process addressing program retrieves the delay for the input to output of a gate, by identifying the gate type (e.g., look-up within the table), locating the slew/load PVT condition within the identified gate type, and retrieving the associated delay. In an embodiment, voltage/processing addressing program 200 graphs individual V-P pairs as a set of canonical coordinates based on a y-axis (e.g., y-axis 302) representing the delay from timing models 116 and an x-axis (e.g., x-axis 310) representing the process corners (e.g., extreme fabrication parameters) as depicted in FIG. 3, multi corner-pair process space 300.

In step 208, voltage/process addressing program 200 performs addressing/projections to the V-P pairs (e.g., process point). The addressing/projection is an exact timing at the individual V-P pair with respect to the process corner and the delay from timing models 116. In one embodiment, voltage/process addressing program 200 calculates an address for each V-P pair based on the process point of each individual V-P pair and the starting corner (e.g., Vnom/Pnom). In another embodiment, voltage/process addressing program 200 performs addressing/projections to the V-P pairs based on a path based solution (i.e., does not calculate minimum and maximums). A path-based solution incorporates an algorithm that sums gate and wire delays on specific paths that are identified prior to running the analysis. In some other embodiment, voltage/process addressing program 200 performs addressing/projections to the V-P pairs by calculating mean only minimum/maximum projections, thereby maintaining full deterministic accuracy at TT with a nominal base process corner or another discrete process corner. In yet another embodiment, voltage/process addressing program 200 performs addressing/projections to the V-P pairs by physically processing a unique canonical per each corner pair. Voltage/process addressing program 200 propagates multiple sets of process sensitivities, but only one process sensitivity per process corner pair. For example, canonical one equals TT to FF, and canonical two equals TT to SS. In one embodiment, voltage/process addressing program 200 utilizes canonical models (i.e., re-usable form of a solution to a design problem) to propagate multiple sets of process sensitivities. In another embodiment, voltage/process addressing program 200 utilizes leverage data compaction (i.e., reduces the number of data elements, without a loss of information by eliminating unnecessary redundancy) to propagate the multiple sets of process sensitivities.

With respect to the aforementioned embodiments, voltage/process addressing program 200 calculates a canonical address of a V-P pair to be: a mean plus a virtual statistical V-P pair multiplied by a process corner (e.g., SS, TT, FF). In one embodiment, voltage/process addressing program 200 utilizes a mean that is a measure of a central tendency of a probability distribution or of the random variable characterized by that distribution. In another embodiment, voltage/process addressing program 200 utilizes a mean in which other sensitivity constants may compact to create a single canonical address that includes multiple sensitivities for a given parameter. Additionally, voltage/process addressing program 200 calculates a virtual statistical parameter as the calculated finite difference (e.g., sigma value) of the V-P pair (step 206). The virtual statistical parameter models the timing value behavior of at least two physical parameters with one non-physical statistical parameter (e.g., the V-P pair represents a single statistical parameter.) For example, virtual statistical parameter $PV_A=(Z\ 326–A\ 318)/\text{delta sigma}$ A, virtual statistical parameter $PV_B=(Z\ 326–B\ 320)/\text{delta}$ sigma B, virtual statistical parameter $PV_C=(Z\ 326–C\ 322)/$ delta sigma C, and virtual statistical parameter $PV_D=(Z\ 326–D\ 324)/\text{delta sigma D}$.

Voltage/process addressing program 200 propagates a multi corner-pair process space (e.g., multi corner-pair process space 300) based on the addressing/projections of the V-P pairs. Voltage/process addressing program 200 divides a timing delay into regions that point to parameter points. During propagation (e.g., max/min/add/subtract) operations, voltage/process addressing program 200 includes like types within the multi corner-pair process space. The like types refer to voltage regions, in which a specific voltage region includes a sensitivity of the virtual parameters that are combined into separate canonicals, thereby minimizing a propagation error in a block based SSTA timing run. For example, voltage/process addressing program 200 identifies the individual V-P pairs and points associated with each individual V-P pair (e.g., A 318, B 320, C 322, and D 324) as like types. Voltage/process addressing program 200 propagates canonicals to represent all region sensitivities at the same time. Voltage/process addressing program 200 evaluates the sets of canonicals as a group. The V-P pair includes two independent terms that represent the same physical parameter, but over two different regions that provide different views into the same data. Voltage/process addressing program 200 divides the timing responses (e.g., delay) of a physical or virtual statistical parameter into the regions based on the V-P pair. Voltage/process addressing program 200 maintains separation (e.g., sensitivity value that is linear) between the endpoints for each region. Voltage/process addressing program 200 enables future accurate navigation of an alternate parameter point to an end point of an identified region, with respect to a nominal or main point, via a single sensitivity (e.g., separation) measurement for a given parameter. For example as depicted in FIG. 3, in order to navigate from D 324 to A 318, the canonical of A calculates the sum of the mean, $PV_A$ 328*Process, and $PV_D$ 334*Process.

As depicted in FIG. 3, voltage/process addressing program 200 propagates multi corner-pair process space 300 for points of interest A 318, B 320, C 322, and D 324 with respect to Z 326 (e.g., starting corner) in which y-axis 302 represents the delay with a scale based on delay—process corner (e.g., D-ss 304), delay—tt (e.g., D-tt 306), and delay—ss (e.g., D-ff 308) and an X axis in which x-axis 310 represents process with a scale of SS 312, TT 314, and FF 316. The process points connect to the starting corner linearly as follows: A 318 connects to Z 326 via $PV_A$ 328, B 320 connects to Z 326 via $PV_B$ 330, C 322 connects to Z 326 via $PV_C$ 332, and D 324 connects to Z 326 via $PV_D$ 334. The address of each point of interest and a corresponding sensitivity between the point of interest and the process corner is known; and therefore, allows for accurate navigation between endpoints directly from a first point of interest to a second point of interest, rather than identifying separate points within the x and y axes for an individual parameter, and then navigating to the endpoint point based upon locating the intersection of the first and second point.

In one alternate embodiment voltage/process addressing program 200 additionally characterizes the delay for integrated circuit design 114. Voltage/process addressing program 200 creates a voltage process matrix of the delay with respect to process and voltage. The resultant matrix separates the two physical parameters (e.g., process and voltage) and correlates the voltage and the process of the delay. Additionally, integrated circuit design 114 includes a fully detailed library of timing data at different process voltage points. Voltage/process addressing program 200 creates a multi-dimensional sigma translation table in which the sigma points are equivalent to the process voltage points. Voltage/process addressing program 200 separates the V-P pair into separate elements. Voltage/process addressing program 200 calculates sigma values (e.g., finite difference) for each of the individual voltage and process values. Voltage/process addressing program 200 calculates the statistical values based on the individual sigma values for each individual voltages and each individual process (e.g., address projection in a voltage process space). Voltage/process addressing program 200 constructs new data points within the range of a discrete set of known data points in the virtual parameter region of Vn/Pn based on changes to the physical parameters of an end point (i.e., applies the sensitivities from the finite differencing to project new sigma points). The multi-dimensional sigma translation table thereby enables the movement from a point of interest to the endpoint within another region (i.e., allows interpolation in a virtual parameter region based on a change in a physical parameter endpoint). In order to enable the aforementioned alternate embodiment, voltage/process addressing program 200 performs the characterization of the delay for a representative instance of integrated circuit design 114, thereby allowing voltage/process addressing program 200 to use the multi-dimensional sigma translation table.

In step 210, voltage/process addressing program 200 provides report 118. Voltage/process addressing program 200 creates and/or provides report 118 to a user at the completion of the analysis for immediate viewing (e.g., onscreen report detailing results for immediate use) and/or storing as an output file that is accessible for future viewing, e-mail, printing, export, etc. by the user. In one embodiment, voltage/process addressing program 200 provides report 118 that includes a detailed analysis of integrated circuit design 114 with respect to timing models 116. In another embodiment, voltage/process addressing program 200 provides report 118 with graphs that depicts a voltage/process space (e.g., typical operation of integrated circuit design 114) and multi corner-pair process space 300 (e.g., represent changes incurred in the voltage/process space due to two parameters for integrated circuit design 114) as depicted in FIG. 3 for viewing and comparison.

In some other embodiment, voltage/process addressing program 200 provides report 118 which includes information pertaining to the critical path, arrival time, required time, slack, verification of proper circuit performance of integrated circuit design 114, and identify problem areas (e.g., failures, non-compliance, etc.) and areas for improvement within integrated circuit design 114. For example, within integrated circuit design 114, voltage/process addressing program 200 identifies positive slack at node, and indicates and/suggests changes to incorporate into integrated circuit design 114 to increase the arrival time at the node without affecting the overall delay of the circuit. Conversely, voltage/process addressing program 200 identifies negative slack at a node (path is too slow) and recommends changes to the path within integrated circuit design 114. Voltage/process addressing program 200 recommends changes that speed up the path and/or incorporate a delay of the reference signal, which corrects integrated circuit design 114 and allows the entirety of integrated circuit design 114 to work at the desired speed. In yet some other embodiment, voltage/process addressing program 200 includes the voltage process matrix of the delay which characterizes the delay of integrated circuit design 114 and/or the multi-dimensional sigma translation table. In an embodiment, voltage/process addressing program 200 includes one or more of the aforementioned embodiments within report 118 for further utilization by a user. Voltage/process addressing program 200 completes after providing report 118.

Figure 4:
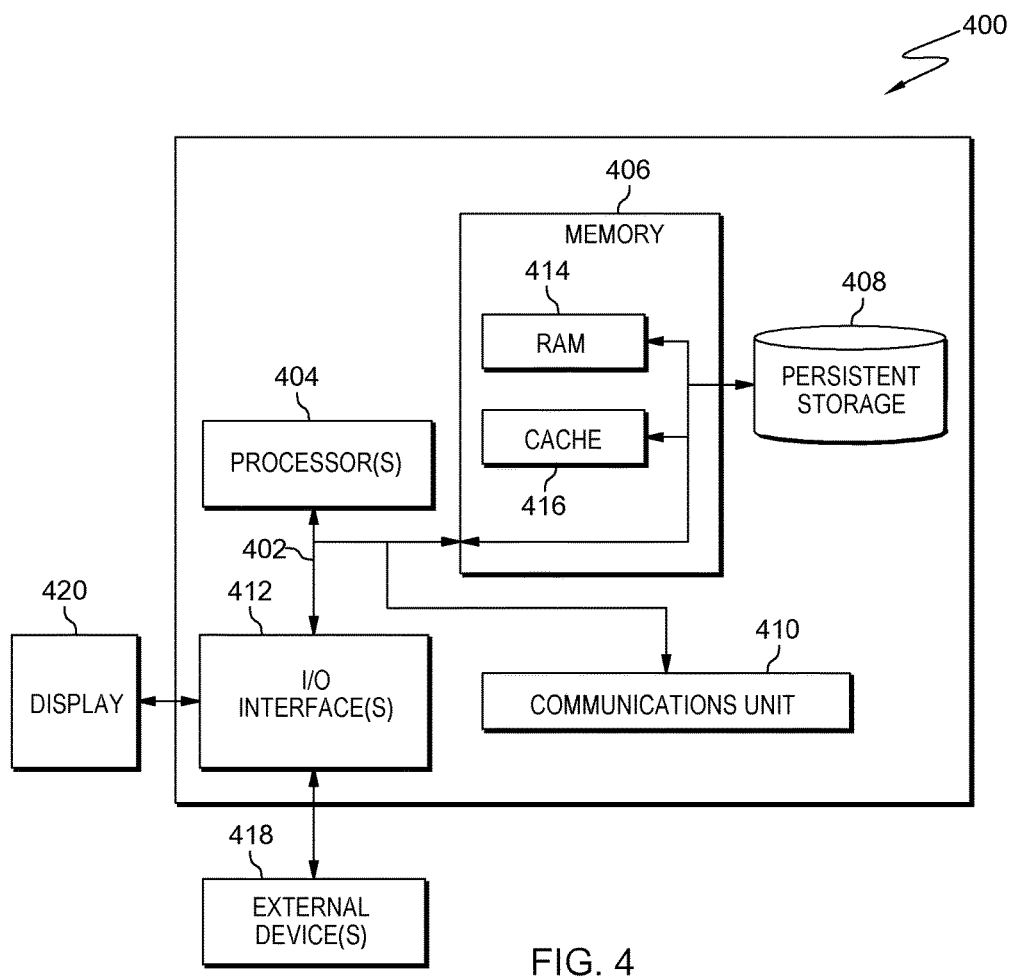
FIG. 4 is a block diagram of components of the computer device executing the voltage/process addressing program, in accordance with an embodiment of the present invention.

FIG. 4 depicts a block diagram of components of computing device 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of computer processor(s) 404 by holding recently accessed data, and data near accessed data, from memory 406.

User interface 112, integrated circuit design 114, timing models 116, report 118, and voltage/process addressing program 200 may be stored in persistent storage 408 and in memory 406 for execution and/or access by one or more of the respective computer processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. User interface 112, integrated circuit design 114, timing models 116, report 118, and voltage/process addressing program 200 may be downloaded to persistent storage 408 through communications unit 410.

I/O interface(s) 412 allows for input and output of data with other devices that may be connected to computing device 400. For example, I/O interface(s) 412 may provide a connection to external device(s) 418, such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user interface 112, integrated circuit design 114, timing models 116, report 118, and voltage/process addressing program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for addressing process and voltage points across voltage and process space, the method comprising:
    computer processors identifying an integrated circuit design;
    the computer processors identifying a timing model associated with the identified integrated circuit design;
    the computer processors identifying a minimum set of voltage/process pairs associated with the integrated circuit design, wherein an operating temperature and frequency are constant;
    the computer processors identifying a number n that defines the number of finite differencing operations to be performed for the identified minimum set of voltage/process pairs;
    the computer processors performing a single statistical static timing analysis with multi-corner projection for the identified integrated circuit based on the identified number n that provides a finite difference for each number of finite differencing operations to be performed based on the identified number n for the identified minimum set of voltage/process pairs;
    the computer processors performing addressing based on an exact timing at each individual voltage/process pairs for the identified minimum set of voltage/process pairs with respect to a process corner and a delay from the identified timing models;
    the computer processors providing a report; and
    the computer processors initiating to manufacture an updated integrated circuit design.

2. The method of claim 1, wherein a voltage process/pair is a virtual statistical parameter that models a timing behavior of two physical parameters into one non-physical parameter with respect to a nominal voltage/nominal process.

3. The method of claim 1, wherein performing the single statistical static timing analysis of the identified integrated circuit design based on the identified number n further comprises:
    the computer processors identifying one or more timing paths within the identified integrated circuit design;
    the computer processors calculating one or more finite differences based on the identified number n for each of the identified one or more timing paths utilizing the identified minimum set of voltage/process pairs;
    the computer processors identifying one or more delays with respect to the identified one or more timing paths within the identified integrated circuit design for the minimum set of voltage/process pairs from within a timing model that identifies the one or more delays via a look-up table by a gate type and a slew/load process, voltage, temperature (PVT) condition; and
    the computer processors graphing the identified minimum set of voltage/process pairs as a set of coordinates based on the identified one or more delays and the calculated one or more finite differences.

4. The method of claim 1, wherein performing the addressing based on the performed statistical static timing analysis further comprises:
    the computer processors calculating a canonical address of the identified minimum set of voltage/process pairs associated with the integrated circuit design, wherein the canonical address is a mean plus a virtual statistical voltage/process pair multiplied by a process corner, wherein the mean is selected from a group consisting of: a measure of a central tendency of a probability distribution, a random variable characterized by the probability distribution, and compacted sensitivity constants that creates a single canonical address that includes multiple sensitivities for a parameter.

5. The method of claim 1, further comprises:
the computer processors characterizing a representative instance of the identified integrated circuit design for a delay that is due to a process voltage;
the computer processors creating a multi-dimensional sigma translation table that includes one or more sigma points that are equivalent to the process voltage points; and
the computer processors calculating one or more new sigma points by applying the finite difference associated with each number of finite differencing operations performed based on the identified number n for the identified minimum set of voltage/process pair.

6. The method of claim 1, further comprises:
the computer processors dividing a timing delay into one or more voltage regions, wherein the one or more voltage regions include a sensitivity of the virtual parameters;
the computer processors creating a separate canonical for each instance of the one or more voltage regions;
the computer processors propagating the created separate canonical for each instance of one or more voltage regions;
the computer processors calculating at least a minimum and a maximum associated with the propagated created separate canonical for each instance of the one or more voltage regions; and
the computer processors combining the calculated at least minimum and maximum associated with the propagated created separate canonical for each instance of the one or more voltage regions to create a single canonical for a set of parameters.

7. The method of claim 1, further comprises:
the computer processors propagating one or more canonicals that represent one or more region sensitivities concurrently;
the computer processors evaluating the one or more canonicals as a group, wherein the voltage/process pair of the one or more canonicals includes two independent terms for a physical parameter, wherein the two independent terms are within two different regions;
the computer processors dividing a delay of the physical parameter of the voltage/process pair into the two different regions;
the computer processors determining a separation between the propagated one or more canonicals, wherein the separation is a linear sensitivity value; and
the computer processors enabling projection from a first endpoint in a first region to a second endpoint in a second region based on the separation between the propagated one or more canonicals.

8. The method of claim 1, further comprises:
the computer processors calculating a virtual statistical parameter based on a calculated finite difference of the identified minimum set of voltage/process pairs associated with the integrated circuit design.

9. The method of claim 1, wherein the report includes an analysis of the received integrated circuit design with respect to timing models, a critical path, an arrival time, a required time, a slack, a verification of proper circuit performance, a failure, a non-compliance, an area of improvement, a change to the integrated circuit design, a voltage process matrix of the delay, a multi-dimensional sigma translation table, and a graph depicting a multi corner-pair process space.

10. The method of claim 1, further comprises:
the computer processors receiving one or more additional voltage/process pairs to the identified minimal set of voltage process pairs.

11. A computer program product for addressing process and voltage points across voltage and process space, the computer program product comprising:
one or more computer readable storage media and program instructions stored on the one or more computer readable storage media, the program instructions comprising:
program instructions to identify an integrated circuit design;
program instructions to identify a timing model associated with the identified integrated circuit design;
program instructions to identify a minimum set of voltage/process pairs associated with the integrated circuit design, wherein an operating temperature and frequency are constant;
program instructions to identify a number n that defines the number of finite differencing operations to be performed for the identified minimum set of voltage/process pairs;
program instructions to perform a single statistical static timing analysis with multi-corner projection for the identified integrated circuit based on the identified number n that provides a finite difference for each number of finite differencing operations to be performed based on n for the identified minimum set of voltage/process pairs;
program instructions to perform addressing based on an exact timing at each individual voltage/process pairs for the identified minimum set of voltage/process pairs with respect to a process corner and a delay from the identified timing models;
program instructions to provide a report; and
program instructions to initiate to manufacture an updated integrated circuit design.

12. The computer program product of claim 11, wherein to perform the single statistical static timing analysis of the identified integrated circuit design based on the identified number n further comprises program instructions, stored on the one or more computer readable storage media, to:
identify one or more timing paths within the identified integrated circuit design;
calculate one or more finite differences based on the identified number n for each of the identified one or more timing paths utilizing the identified minimum set of voltage/process pairs;
identify one or more delays with respect to the identified one or more timing paths within the identified integrated circuit design for the minimum set of voltage/process pairs from within a timing model that identifies the one or more delays via a look-up table by a gate type and a slew/load process, voltage, temperature (PVT) condition; and
graph the identified minimum set of voltage/process pairs as a set of coordinates based on the identified one or more delays and the calculated one or more finite differences.

13. The computer program product of claim 11, further comprises program instructions, stored on the one or more computer readable storage media, to:
characterize a representative instance of the identified integrated circuit design for a delay that is due to a process voltage;

create a multi-dimensional sigma translation table that includes one or more sigma points that are equivalent to the process voltage points; and calculate one or more new sigma points by applying the finite difference associated with each number of finite differencing operations performed based on the identified number n for the identified minimum set of voltage/process pair.

14. The computer program product of claim 11, further comprises program instructions, stored on the one or more computer readable storage media, to:

divide a timing delay into one or more voltage regions, wherein the one or more voltage regions include a sensitivity of the virtual parameters;

create a separate canonical for each instance of one or more voltage regions;

propagate the created separate canonical for each instance of one or more voltage regions;

calculate at least a minimum and a maximum associated with the propagated created separate canonical for each instance of the one or more voltage regions; and combine the calculated at least minimum and maximum associated with the propagated created separate canonical for each instance of the one or more voltage regions to create a single canonical for a set of parameters.

15. The computer program product of claim 11, further comprises program instructions, stored on the one or more computer readable storage media, to:

propagate one or more canonicals that represent one or more region sensitivities concurrently;

evaluate the one or more canonicals as a group, wherein the voltage/process pair of the one or more canonicals includes two independent terms for a physical parameter, wherein the two independent terms are within two different regions;

divide a delay of the physical parameter of the voltage/process pair into the two different regions;

determine a separation between the propagated one or more canonicals, wherein the separation is a linear sensitivity value; and enable projection from a first endpoint in a first region to a second endpoint in a second region based on the separation between the propagated one or more canonicals.

16. A computer system for addressing process and voltage points across voltage and process space, the computer system comprising:

one or more computer processors, one or more computer readable storage media, and program instructions stored on the computer readable storage media for execution by at least one of the one or more processors, the program instructions comprising:

program instructions to identify an integrated circuit design;

program instructions to identify a timing model associated with the identified integrated circuit design;

program instructions to identify a minimum set of voltage/process pairs associated with the integrated circuit design, wherein an operating temperature and frequency are constant;

program instructions to identify a number n that defines the number of finite differencing operations to be performed for the identified minimum set of voltage/process pairs;

program instructions to perform a single statistical static timing analysis with multi-corner projection for the identified integrated circuit based on the identified number n that provides a finite difference for each number of finite differencing operations to be performed based on n for the identified minimum set of voltage/process pairs;

program instructions to perform addressing based an exact timing at each individual voltage/process pairs for the identified minimum set of voltage/process pairs with respect to a process corner and a delay from the identified timing models;

program instructions to provide a report; and program instructions to initiate to manufacture the updated integrated circuit design.

17. The computer system of claim 16, wherein to perform the single statistical static timing analysis of the identified integrated circuit design based on the identified number n further comprises program instructions, stored on the one or more computer readable storage media, to:

identify one or more timing paths within the identified integrated circuit design;

calculate one or more finite differences based on the identified number n for each of the identified one or more timing paths utilizing the identified minimum set of voltage/process pairs;

identify one or more delays with respect to the identified one or more timing paths within the identified integrated circuit design for the minimum set of voltage/process pairs from within a timing model that identifies the one or more delays via a look-up table by a gate type and a slew/load process, voltage, temperature (PVT) condition; and graph the identified minimum set of voltage/process pairs as a set of coordinates based on the identified one or more delays and the calculated one or more finite differences.

18. The computer system of claim 16, further comprises program instructions, stored on the one or more computer readable storage media, to:

characterize a representative instance of the identified integrated circuit design for a delay that is due to a process voltage;

create a multi-dimensional sigma translation table that includes one or more sigma points that are equivalent to the process voltage points; and calculate one or more new sigma points by applying the finite difference associated with each number of finite differencing operations performed based on the identified number n for the identified minimum set of voltage/process pair.

19. The computer system of claim 16, further comprises program instructions, stored on the one or more computer readable storage media, to:

divide a timing delay into one or more voltage regions, wherein the one or more voltage regions include a sensitivity of the virtual parameters;

create a separate canonical for each instance of one or more voltage regions;

propagate the created separate canonical for each instance of one or more voltage regions;

calculate at least a minimum and a maximum associated with the propagated created separate canonical for each instance of the one or more voltage regions; and combine the calculated at least minimum and maximum associated with the propagated created separate canonical for each instance of the one or more voltage regions to create a single canonical for a set of parameters.

20. The computer system of claim 16, further comprises program instructions, stored on the one or more computer readable storage media, to:
- propagate one or more canonicals that represent one or more region sensitivities concurrently;
- evaluate the one or more canonicals as a group, wherein the voltage/process pair of the one or more canonicals includes two independent terms for a physical parameter, wherein the two independent terms are within two different regions;
- divide a delay of the physical parameter of the voltage/process pair into the two different regions;
- determine a separation between the propagated one or more canonicals, wherein the separation is a linear sensitivity value; and
- enable projection from a first endpoint in a first region to a second endpoint in a second region based on the separation between the propagated one or more canonicals.

* * * * *